United States Patent
Sim et al.

(10) Patent No.: US 10,991,140 B2
(45) Date of Patent: Apr. 27, 2021

(54) SYSTEM SUITABLE FOR ONE OR BOTH OF AUDIO PROCESSING AND GRAPHICS PROCESSING AND A METHOD OF PROCESSING IN ASSOCIATION THEREWITH

(71) Applicant: Creative Technology Ltd, Singapore (SG)

(72) Inventors: Wong Hoo Sim, Singapore (SG); Teck Chee Lee, Singapore (SG); Keng Shoon Gerald Tan, Singapore (SG); Shin Yee Chung, Singapore (SG); Darran Nathan, Singapore (SG); Yuan Yeow Leow, Singapore (SG); Nathan Charles, Woking (GB); Desmond Hll, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 16/198,368

(22) Filed: Nov. 21, 2018

(65) Prior Publication Data

US 2019/0096110 A1    Mar. 28, 2019

Related U.S. Application Data

(63) Continuation of application No. 15/109,628, filed as application No. PCT/SG2014/000617 on Dec. 24, 2014, now abandoned.

(30) Foreign Application Priority Data

Jan. 3, 2014 (SG) ................. 201400088-9

(51) Int. Cl.
*G06T 11/60* (2006.01)
*A63F 13/52* (2014.01)
(Continued)

(52) U.S. Cl.
CPC .............. *G06T 11/60* (2013.01); *A63F 13/20* (2014.09); *A63F 13/31* (2014.09); *A63F 13/40* (2014.09);
(Continued)

(58) Field of Classification Search
CPC ......... G06T 11/60; G06T 15/04; G06T 13/40; A63F 13/20; A63F 13/52; A63F 13/54;
(Continued)

(56) References Cited

U.S. PATENT DOCUMENTS

| | | | |
|---|---|---|---|
| 2003/0021448 A1* | 1/2003 | Chen | ............... G06K 9/00268 382/117 |
| 2005/0090302 A1 | 4/2005 | Campbell et al. | |

(Continued)

FOREIGN PATENT DOCUMENTS

| | | |
|---|---|---|
| EP | 1391226 A1 | 2/2004 |
| JP | 09-081772 A | 3/1997 |

(Continued)

OTHER PUBLICATIONS

Doenges P K et al: "Audio/video and synthetic graphics/audio for mixed media", Signal Processing. Image Communication, Elsevier Science Publishers, Amsterdam, NL, vol. 9, No. 4, May 1, 1997, pp. 433-463.

*Primary Examiner* — Xilin Guo
(74) *Attorney, Agent, or Firm* — Russell Swerdon; Desmund Gean

(57) ABSTRACT

A method of processing which can include receiving input signals from a plurality of sources, data mining the input signals, interpreting the mined data, optionally providing a set of settings and processing the input signals based on the interpretation of the mined data and, optionally, the set of settings to produce output signals. The input signals can be data mined to identify one or both of unique characteristics (Continued)

and attributes associable with the input signals. The mined data can be interpreted in a manner so as to form association based on one or both of the unique characteristics and attributes. The output signals can correspond to adaptably altered input signals which can be associated with adaptable alteration of one or both of visual perception and audio perception of the input signals.

12 Claims, 7 Drawing Sheets

(51) Int. Cl.
| | |
|---|---|
| *A63F 13/54* | (2014.01) |
| *A63F 13/60* | (2014.01) |
| *A63F 13/31* | (2014.01) |
| *A63F 13/40* | (2014.01) |
| *H04L 29/06* | (2006.01) |
| *H04L 29/08* | (2006.01) |
| *H04N 21/235* | (2011.01) |
| *H04N 21/266* | (2011.01) |
| *H04N 21/2662* | (2011.01) |
| *H04N 21/44* | (2011.01) |
| *H04N 21/462* | (2011.01) |
| *H04N 21/854* | (2011.01) |
| *A63F 13/20* | (2014.01) |
| *G06F 3/16* | (2006.01) |

(52) U.S. Cl.
CPC .............. *A63F 13/52* (2014.09); *A63F 13/54* (2014.09); *A63F 13/60* (2014.09); *G06F 3/165* (2013.01); *H04L 65/605* (2013.01); *H04L 65/608* (2013.01); *H04L 67/28* (2013.01); *H04N 21/235* (2013.01); *H04N 21/2662* (2013.01); *H04N 21/26603* (2013.01); *H04N 21/44* (2013.01); *H04N 21/4621* (2013.01); *H04N 21/854* (2013.01); *A63F 2300/209* (2013.01)

(58) Field of Classification Search
CPC .... A63F 13/60; A63F 2300/209; A63F 13/31; A63F 13/40; G06F 3/165; G06F 16/9577; G06F 11/3466; G06F 1/1626; G06F 3/0481; G06F 9/455; H04N 21/235; H04N 21/25503; H04N 21/2662; H04N 21/44; H04N 21/4621; H04N 21/854; H04N 19/182; G06Q 30/0252; G06Q 30/0269; H04L 41/22; H04L 67/2823; H04L 29/06; G06K 9/00281
See application file for complete search history.

(56) References Cited

U.S. PATENT DOCUMENTS

| | | | |
|---|---|---|---|
| 2005/0104889 A1* | 5/2005 | Clemie | ..................... G06T 1/20 345/522 |
| 2009/0054140 A1 | 2/2009 | Beser et al. | |
| 2010/0033427 A1 | 2/2010 | Marks et al. | |
| 2010/0227685 A1 | 9/2010 | Mori | |
| 2010/0234106 A1* | 9/2010 | Kojima | ................... A63F 13/52 463/31 |
| 2013/0172079 A1 | 7/2013 | Ivanov et al. | |
| 2013/0316828 A1 | 11/2013 | Ur et al. | |
| 2013/0344940 A1 | 12/2013 | Kurabayashi et al. | |
| 2013/0344960 A1 | 12/2013 | Perry | |
| 2014/0375683 A1* | 12/2014 | Salter | ................ G02B 27/0172 345/633 |

FOREIGN PATENT DOCUMENTS

| | | |
|---|---|---|
| JP | 2010-097460 A | 4/2010 |
| WO | 2004/049607 A1 | 6/2004 |

* cited by examiner

SYSTEM SUITABLE FOR ONE OR BOTH OF AUDIO PROCESSING AND GRAPHICS PROCESSING AND A METHOD OF PROCESSING IN ASSOCIATION THEREWITH

This Application is a Continuation of U.S. patent application Ser. No. 15/109,628, filed 1 Jul. 2016, which is a National Stage (§ 371) of International Application No. PCT/SG2014/000617, filed 24 Dec. 2014, which claims the benefit of priority from Singapore Application No. 201400088-9, filed 3 Jan. 2014, which applications are incorporated by reference herein in their entireties.

FIELD OF INVENTION

The present disclosure generally relates to a system suitable for one or both of audio processing and graphics processing, and a method of processing in association with the system.

BACKGROUND

Generally, an electronic system would require an application programming interface (API) for the purpose of rendering two dimensional (2D) and/or three dimensional (3D) electronic graphics. Open Graphics Library (hereinafter "OpenGL®") is one such example.

OpenGL® is currently an industry standard for computer graphics with defined APIs which is supported by hardware vendors and which is commonly used by software programmers.

For hardware vendors such as device manufacturers, OpenGL® based drivers can be provided for their graphics subsystems. For example, an electronic tablet device may use a graphics processing unit (GPU) which requires an Android® based OpenGL® driver.

Appreciably, with the use of OpenGL®, it is possible to ensure portability of applications across various graphics processors.

To illustrate, FIG. 1 shows a typical processing system 102 which includes a number of operating modules 104 and an input device 106.

As shown, the processing system 102 can include a first operating module 104a, a second operating module 104b, a third operating module 104c and a fourth operating module 104d. The first operating module 104a can be an application layer. The second operating module 104b can be an engine layer. The third operating module 104c can be an API layer. The fourth operating module 104d can be an operating system (OS) layer.

The input device 106 can be coupled to the first operating module 104a. The input device 106 can be configured to receive input signals and process the input signals to produce control signals which can be communicated to the first operating module 104a.

In an exemplary scenario, the processing system 102 can correspond to an electronic device operable to play a game. Further, the processing system 102 can be based on an Android® based OS.

In this regard, the first operating module 104a can be related to a game based application, the second operating module 104b can be a game engine, the third operating module 104c can be related to an OpenGL® based API layer and the fourth operating module 104d can be related to an Android® based OS layer.

Additionally, the input device 106 can, for example, be a touch sensitive screen which is capable of sensing touch from a user. For example, a user can play a game on the electronic device by touching the input device 106. Therefore, user touch sensed by the input device 106 can be considered to be input signals. As mentioned, the input signals can be processed by the input device 106 and communicated to the first operating module 104a. The processed input signals can be communicated to the first operating module 104a to control, for example, game play (e.g., events and/or actions) as the game progresses.

Game based applications (i.e., at the first layer 104a) typically rely on game engines (i.e., at the second layer 104b) for processing tasks which are graphics and/or audio related.

Additionally, if modifications are desired, there may be a need to modify game sourcecode and/or release packages.

Appreciably, conventional processing techniques do not facilitate processing in an efficient and/or user friendly manner.

It is therefore desirable to provide a solution to address at least one of the foregoing problems.

SUMMARY OF THE INVENTION

In accordance with an aspect of the disclosure, a method of processing is provided. The method includes:
1) receiving input signals from a plurality of sources;
2) data mining the input signals to identify one or both of unique characteristics and attributes associable with the input signals;
3) interpreting the mined data in a manner so as to form association based on one or both of the unique characteristics and attributes;
4) optionally providing a set of settings; and
5) processing the input signals based on the interpretation of the mined data and, optionally, the set of settings to produce output signals.

The output signals can correspond to adaptably altered input signals which can be associated with adaptable alteration of one or both of visual perception and audio perception of the input signals.

BRIEF DESCRIPTION OF THE DRAWINGS

Embodiments of the disclosure are described hereinafter with reference to the following drawings, in which.

DETAILED DESCRIPTION

Representative embodiments of the disclosure, for addressing one or more of the foregoing problems, are described hereinafter with reference to FIG. 2 to FIG. 6.

Figure 2:
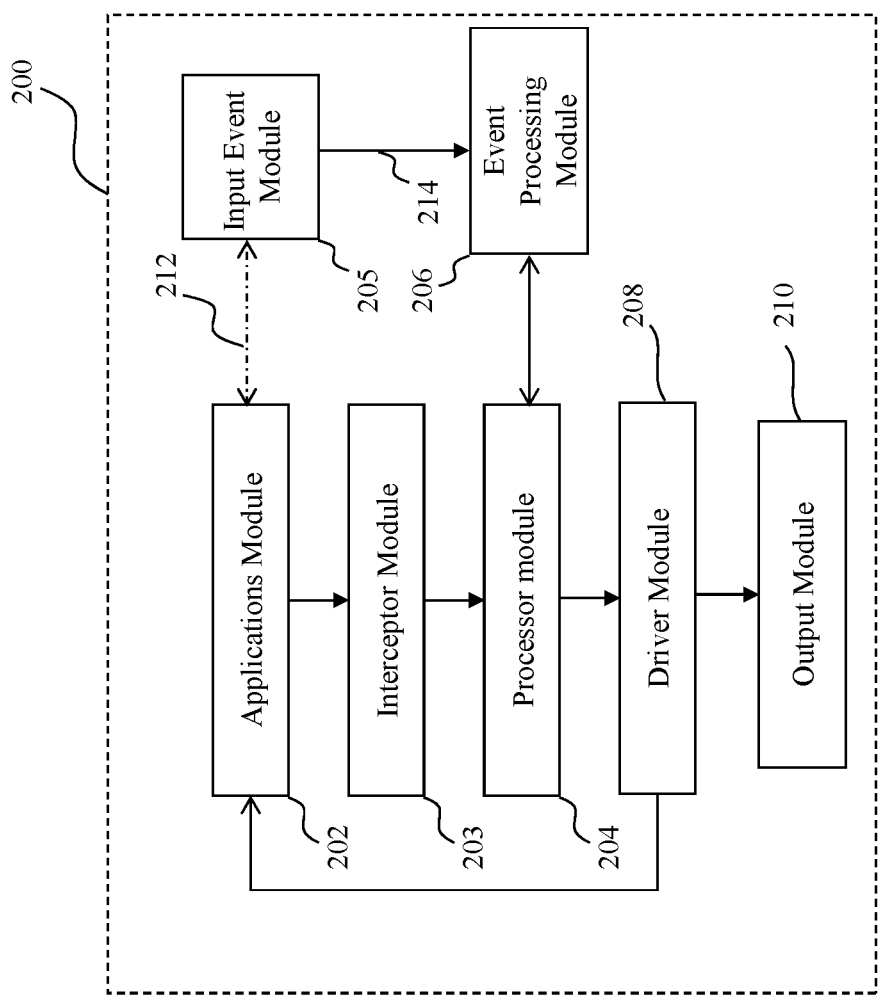
FIG. 2 shows a system suitable for one or both of audio processing and graphics processing, in accordance with an embodiment of the disclosure.

FIG. 2 shows a system 200 in accordance with an embodiment of the disclosure. The system 200 can be suitable for one or both of audio processing and graphics processing. The system 200 can, for example, be a computer.

The system 200 can, in one embodiment, include an applications module 202, an interceptor module 203 and a processor module 204. The system 200 can, in another embodiment, further include an input event module 205 and an event processing module 206. The system 200 can, in yet another embodiment, further include a driver module 208 and an output module 210.

As shown, the applications module 202 can be coupled to the interceptor module 203. The input event module 205 can be coupled to the event processing module 206. The processor module 204 can be coupled to one or both of the interceptor module 203 and the event processing module 206.

The processor module 204 can be coupled to the driver module 208. The driver module 208 can be coupled to the output module 210. The driver module 208 can be further coupled to the applications module 202.

Operationally, the applications module 202 can be configured to generate application signals and communicate the application signals to the interceptor module 203. The interceptor module 203 can process the application signals to produce interceptor signals. The interceptor signals can be communicated from the interceptor module 203 to the processor module 204 for further processing.

Additionally, the input event module 205 can be configured to receive input signals. Preferably, the input signals can be communicated from the input event module 205 to the event processing module 206 for processing. Alternatively, the input event module 205 can be configured to process the received input signals and the processed input signals can be communicated from the input event module 205 to the event processing module 206 for further processing.

Figure 1:
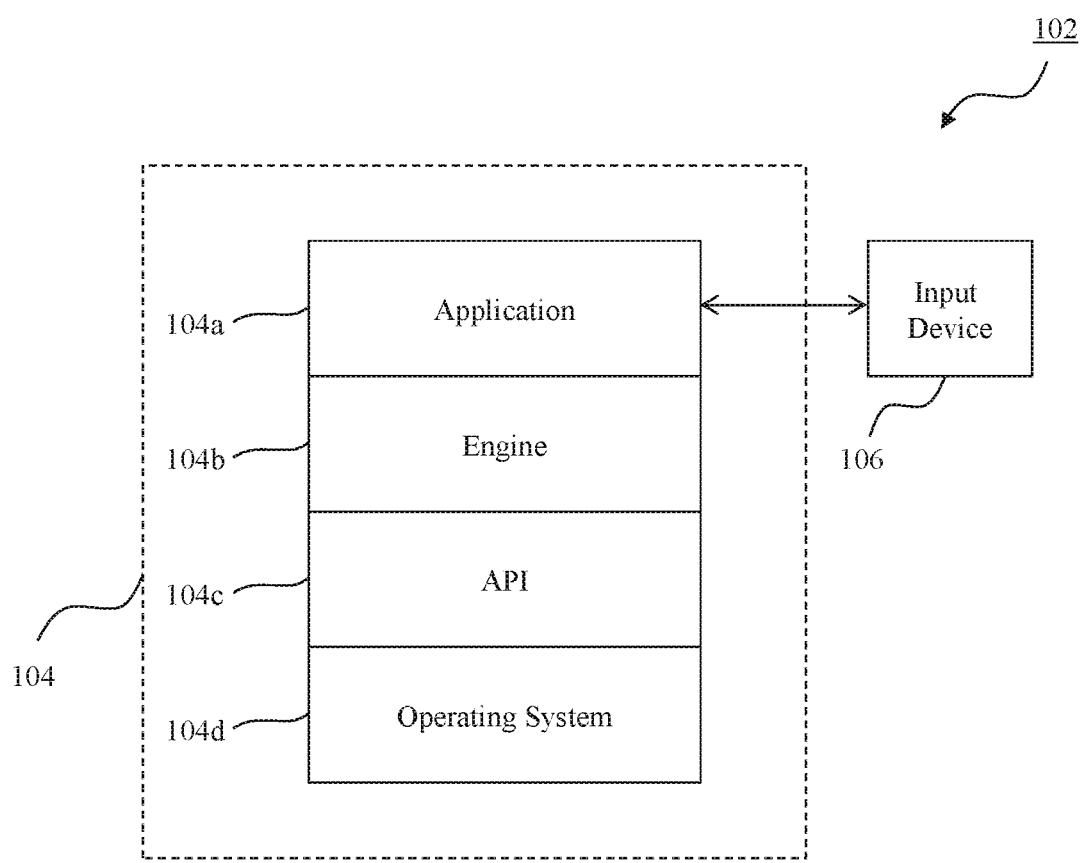
FIG. 1 shows a typical processing system in association with conventional graphics and/or audio processing.

The input event module 205 can be similar to the input device 106 discussed in FIG. 1. However, instead of communicating input signals/processed input signals directly to the applications module 202 (per communication of processed input signals from the input device 106 to the first operating module 104a as discussed in FIG. 1), input signals/processed input signals are communicated to the event processing module 206. A dotted double arrow line 212 signifies that input signals/processed input signals could be communicated directly from the input event module 205 to the applications module 202, but, as an option, it is possible not to do so. Instead (as signified by a solid arrow 214), as an option, input signals/processed input signals are communicated from the input event module 205 to the event processing module 206 for further processing.

The event processing module 206 can be configured to receive and process the input signals/processed input signals to produce event signals. The event processing module 206 can be further configured to communicate the event signals to the processor module 204 for further processing.

The processor module 204 can be configured to receive one or both of the interceptor signals (i.e., from the interceptor module 203) and the event signals (i.e., from the event processing module 206) for processing to produce control signals. This will be discussed later in further detail with reference to FIG. 4.

The processor module 204 can be further configured to communicate the control signals to the driver module 208.

The driver module 208 can be configured to receive and process the control signals to produce driver signals. This will be discussed later in further detail with reference to FIG. 3 and FIG. 4.

The driver module 208 can be further configured to communicate the driver signals to one or both of the applications module 202 and the output module 210. This will be discussed later in further detail with reference to FIG. 3 and FIG. 4.

The applications module 202 can be configured to receive the driver signals. Based on the driver signals, the applications module 202 can, optionally, be configured to modify the application signals communicated to the interceptor module 203. This will be discussed later in further detail with reference to FIG. 4.

The output module 210 can be configured to receive the driver signals. Based on the driver signals, the output module 210 can be configured to produce output signals which can be one or both of audibly perceived and visually perceived. This will be discussed later in further detail with reference to FIG. 3 and FIG. 4.

Figure 3:
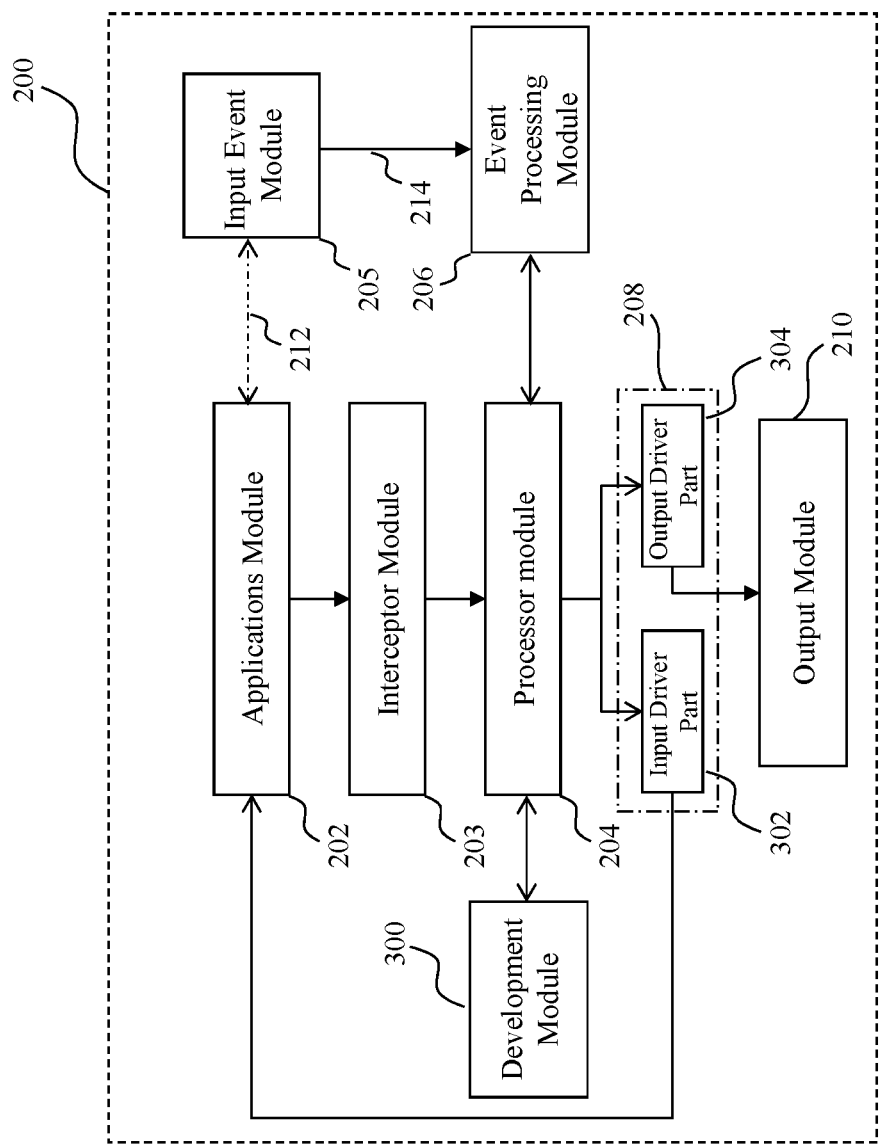
FIG. 3 shows, in further detail, the system of FIG. 2 which can optionally include a development module, in accordance with an embodiment of the disclosure.

Referring to FIG. 3, the system 200 can, in accordance with an embodiment of the disclosure, further include a development module 300. Furthermore, as shown, the driver module 208 can include one or both of an input driver part 302 and an output driver part 304.

The development module 300 can be coupled to the processor module 204. The processor module 204 can be coupled to one or both of the input driver part 302 and the output driver part 304. The input driver part 302 can be coupled to the applications module 202. The output driver part 304 can be coupled to the output module 210.

The development module 300 can be configured to communicate additional input signals to the processor module 204. The processor module 204 can, as an option, produce control signals based on the additional input signals communicated from the development module 300. The processor module 204 can, as another option, produce control signals based on the additional input signals (i.e., communicated from the development module 300) in combination with the interceptor signals and/or the event signals. This will be discussed later in further detail with reference to FIG. 4 and FIG. 5.

Earlier mentioned, the driver module 208 can be coupled to one or both of the applications module 202 and the output module 210. The driver module 208 can be configured to receive and process the control signals from the processor module 204 to produce driver signals which can be communicated to one or both of the applications module 202 and the output module 210.

Specifically, the input driver part 302 can be configured to receive and process the control signals to produce input driver signals which can be communicated to the applications module 202. Based on the input driver signals, communication of application signals from the applications module 202 can be affected as will be discussed later.

Additionally, the output driver part 304 can be configured to receive and process the control signals to produce output driver signals which can be communicated to the output module 210. Based on the output driver signals, the output module 210 can be configured to produce output signals which can be one or both of audibly perceived and visually perceived as will be discussed later in further detail with reference to FIG. 4.

In this regard, it is appreciable that the driver signals communicated from the driver module 208 can include one or both of input driver signals and output driver signals.

As mentioned earlier in FIG. 2 and FIG. 3, the system 200 can be suitable for one or both of audio processing and graphics processing. In this regard, the application signals can be associated with one or both of audio based signals and graphics based signals.

The application signals can in actuality be communicated from the applications module 202 to the driver module 208 for processing and driver signals produced by the driver module 208 can be based on the application signals. In this regard, application signals can be communicated from the applications module 202 to the driver module 208 for processing in a manner so that the application signals are subsequently one or both of audibly perceivable and visually perceivable. Specifically, based on driver signals communicated from the driver module 208, output signals can be produced by the output module 210. The output module 210 enables the output signals to be audibly and/or visually perceived. Therefore, the output module 210 effectively enables the application signals to be one or both of audibly perceivable and visually perceivable.

However, as discussed earlier, the driver module 208 can be configured to receive and process the control signals communicated from the processor module 204 to produce driver signals. Therefore, the driver signals communicated from the driver module 208 can be based on control signals communicated from the processor module 204.

In this regard, it is appreciable that the control signals can, for example, correspond to modified application signals. Modification of application signals can be one or both of audio based and graphics based. Based on the modification, audio perception and/or visual perception of the application signals can be altered.

Earlier mentioned, the control signals can be produced by the processor module 204 based on any of the interceptor signals, the event signals and the additional input signals, or any combination thereof (i.e., based on the interceptor signals, the event signals and/or the additional input signals).

In one exemplary scenario, the processor module 204 can be configured to produce the control signals based on the interceptor signals communicated from the interceptor module 203.

In this regard, the application signals are communicated to the interceptor module 203 for processing to produce interceptor signals which can subsequently be communicated to the driver module 208 (after further processing by the processor module 204), it is appreciable that the driver signals produced by the driver module 208 can be based on the interceptor signals. Based on driver signals communicated from the driver module 208, output signals can be produced by the output module 210. The output signals can be audibly and/or visually perceived. Therefore, the output module 210 effectively enables the interceptor signals to be one or both of audibly perceivable and visually perceivable.

Therefore, it is appreciable that it is possible to produce modified application signals by making modifications to/altering (audio based and/or graphics based) the application signals based on the interceptor signals.

It is also appreciable that the interceptor module 203 can, effectively, be configured to intercept communication of application signals between the applications module 202 and the driver module 208 to produce the interceptor signals.

In another exemplary scenario, the processor module 204 can be configured to produce the control signals based on the event signals communicated from the event processing module 206.

Earlier mentioned, instead of communicating input signals/processed input signals directly to the applications module 202 for processing, input signals/processed input signals are communicated to the event processing module 206 to produce event signals. The event signals can be communicated from the event processing module 206 to the processor module 204. Based on the event signals, the processor module 204 can be configured to produce control signals.

Therefore, it is appreciable that the event processing module 206 can, effectively, be configured to intercept communication of input signals/processed input signals between the input event module 205 and the applications module 202. The intercepted input signals/processed input signals can be processed by the event processing module 206 to produce event signals which can be communicated to and processed by the processor module 204 to produce control signals.

Effectively, it is possible to produce modified application signals by making modifications to/altering (audio based and/or graphics based) the application signals based on the event signals.

In yet another exemplary scenario, the processor module 204 can be configured to produce the control signals based on a combination of the interceptor signals and the event signals communicated, respectively, from the interceptor module 203 and the event processing module 206.

For example, the processor module 204 can be configured to further process the received interceptor signals based on the event signals to produce the control signals. This will be discussed later in further detail with reference to FIG. 4.

Therefore, it is appreciable that the interceptor module 203 can, effectively, be configured to intercept communication of application signals between the applications module 202 and the driver module 208. Moreover, the event processing module 206 can, effectively, be configured to intercept communication of input signals/processed input signals between the input event module 205 and the applications module 202. The interceptor signals and the event signals can be produced in the manner discussed earlier.

Effectively, it is possible to produce modified application signals by making modifications to/altering (audio based and/or graphics based) the application signals based on a combination of the interceptor signals and the event signals.

Although it is mentioned that the system 200 can include the input event module 205, the event processing module 206 and/or the development module 300, it is possible that the input event module 205, the event processing module 206 and/or the development module 300 can, in an alternative arrangement, be separate from (i.e., external to) the system 200. In one example, each of the input event module 205, the event processing module 206 and/or the development module 300 can be an external device/module coupled to the system 200. In another example, the input event module 205, the event processing module 206 and/or the development module 304 can be associated with another system coupled to the system 200 (e.g., the event processing module 206 can be a part of another computer which can be coupled to the system 200).

Likewise, the interceptor module 203 and/or the processor module 204 can, in an alternative arrangement, be separate from (i.e., external to) the system 200. In this regard, the interceptor module 203 and/or the processor module 204 can correspond to an apparatus or device or module operable or suitable for use with the system 200. The interceptor module 203 and/or the processor module 204 can also correspond to an apparatus or device or module coupled to the system 200. For example, the interceptor module 203 and/or processing module 204 can be part of an apparatus or a device coupled to the system 200 in the manner as shown in FIG. 2/FIG. 3 (in which case, it can be said that an apparatus which includes the interceptor module 203 and/or the processor module 204 can be operated with/suitable for use with/coupled to the system 200). The interceptor module 203 and/or the processor module 204 can also be residing in another system coupled to the system 200 (e.g., the interceptor module 203 and/or the processor module 204 can be a part of another computer which can be coupled to the system 200).

In sum, based on the foregoing discussion, it is appreciable that there can be an apparatus/device/module which is operable/suitable for use with the system 200 or which can be coupled to the system 200 in the manner as shown in FIG. 2/FIG. 3. The apparatus/device/module can include the interceptor module 203, the processor module 204, the event processing module 206 and/or the development module 300, or any combination thereof. The apparatus/device/module can, optionally, further include the input event module 205.

The system 200 will be discussed in further detail with reference to FIG. 4 hereinafter.

Figure 4:
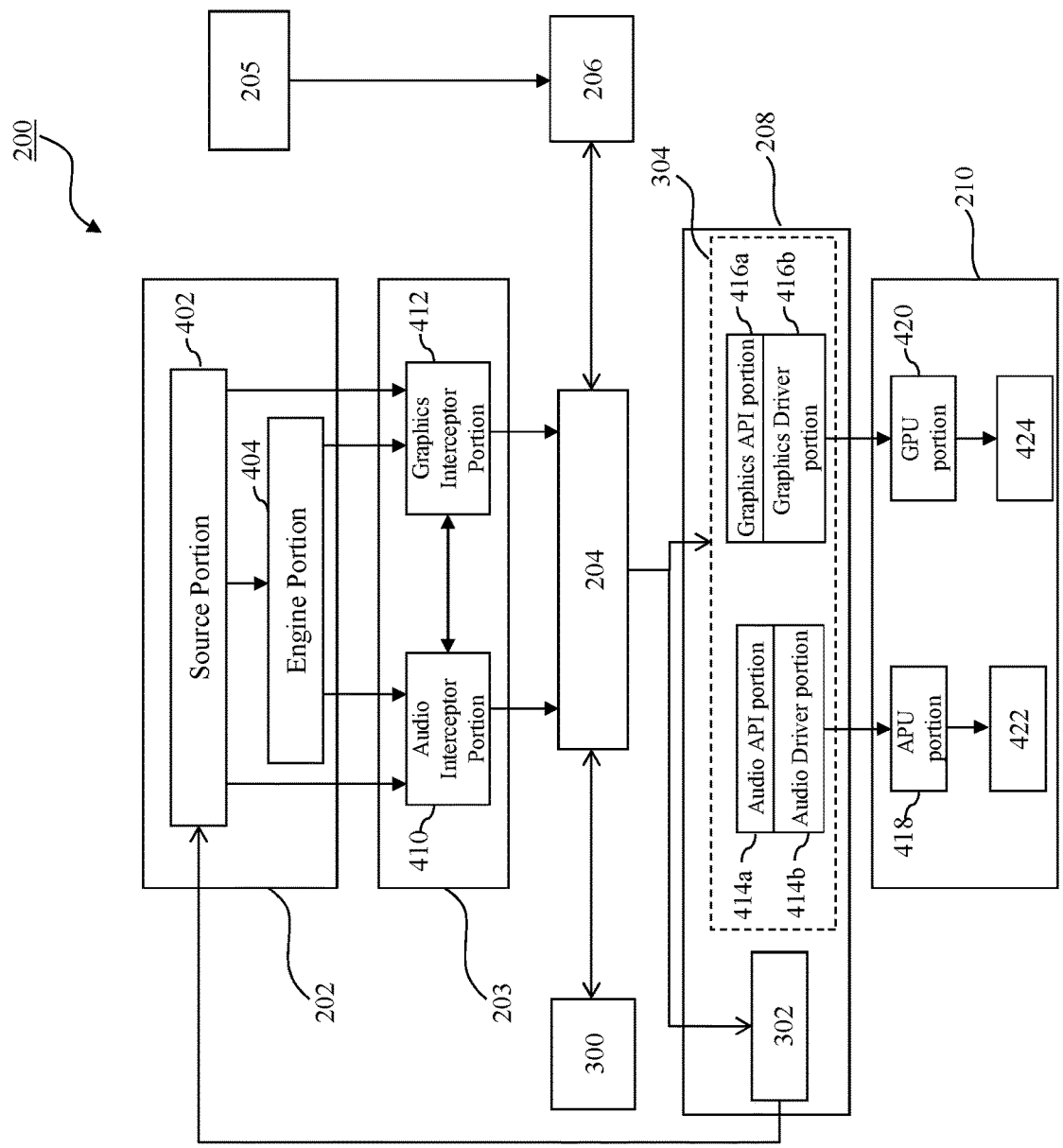
FIG. 4 shows, in further detail, the system of FIG. 3 which can include an interceptor module including, for example, one or both of an audio interceptor portion and a graphics interceptor portion, in accordance with an embodiment of the disclosure.

FIG. 4 shows the system 200 in further detail, in accordance with an embodiment of the disclosure. As shown, the applications module 202 can include a source portion 402 and, optionally, an engine portion 404. The interceptor module 203 can, for example, include one or both of an audio interceptor portion 410 and a graphics interceptor portion 412. Earlier mentioned, the driver module 208 can include one or both of an input driver part 302 and an output driver part 304. The output driver part 304 can include an audio API portion 414a, an audio driver portion 414b, a graphics API portion 416a and a graphics driver portion 416b. The output module 210 can include one or both of an audio processing unit (APU) portion 418 and a graphics processing unit (GPU) portion 420. The output module 210 can further include one or both of an audio reproduction portion 422 and a display portion 424.

The source portion 402 can be coupled to the engine portion 404. One or both of the source portion 402 and the engine portion 404 can be coupled to one or both of the audio interceptor potion 410 and the graphics interceptor portion 412.

Additionally, the audio interceptor portion 410 and the graphics interceptor portion 412 can, optionally, be coupled to each other. One or both of the audio interceptor portion 410 and the graphics interceptor portion 412 can be coupled to the processor module 204.

Earlier mentioned, the input event module 205 can be coupled to the event processing module 206. The event processing module 206 can be coupled to the processor module 204. The development module 300 can be coupled to the processor module 204.

The processor module 204 can be coupled to one or both of the input driver part 302 and the output driver part 304. The input driver part 302 can be coupled to the source portion 402.

The audio API portion 414a can be coupled to the audio driver portion 414b and the graphics API portion 416a can be coupled to the graphics driver portion 416b. The audio driver portion 414b can be coupled to the APU portion 418 and the graphics driver portion 416b can be coupled to the GPU portion 420. The APU portion 418 can be coupled to the audio reproduction portion 422 and the GPU portion 420 can be coupled to the display portion 424.

In general, at the applications module 202, the source portion 402 can be configured to communicate data signals to one or both of the engine portion 404 and the interceptor module 203. The engine portion 404 can be configured to receive and process the data signals to produce engine signals. In this regard, the aforementioned application signals can correspond to one or both of data signals and engine signals.

The interceptor module 203 can be configured to receive and process one or both of the data signals and the engine signals to produce interceptor signals. Particularly, the audio interceptor portion 410 can be configured to receive and process one or both of the data signals and the engine signals to produce audio interceptor signals. The graphics interceptor portion 412 can be configured to receive and process one or both of the data signals and the engine signals to produce graphics interceptor signals.

In this regard, the aforementioned interceptor signals can include one or both of audio interceptor signals and graphics interceptor signals.

Additionally, the audio and graphics interceptor portions 410/412 can, optionally, be configured to signal communicate with each other. Appreciably, the audio interceptor portion 410 can, optionally, be configured to produce audio interceptor signals based on the graphics interceptor signals in addition to one or both of the data signals and the engine signals. Similarly, the graphics interceptor portion 412 can, optionally, be configured to produce graphics interceptor signals based on the audio interceptor signals in addition to one or both of the data signals and engine signals.

As mentioned earlier, the processor module 204 can be configured to produce control signals based on any of the interceptor signals, the event signals and the additional input signals, or any combination thereof (i.e., based on the interceptor signals, the event signals and/or the additional input signals).

The driver module 208 can be configured to receive and process the control signals to produce driver signals. Particularly, the audio API portion 414a and the audio driver portion 414b, in combination, can be configured to receive and process the control signals to produce audio driver signals. The graphics API portion 416a and the graphics driver portion 416b, in combination, can be configured to receive and process the control signals to produce graphics driver signals.

The control signals received by the combination of the audio API portion 414a and the audio driver portion 414b can, for example, be based on at least the audio interceptor signals. The control signals received by the combination of the graphics API portion 416a and the graphics driver portion 416b can, for example, be based on at least the graphics interceptor signals. The control signals received by the input driver part 302 can, for example, be based on at least the event signals (communicated from the event processing module 206) and/or the additional input signals (communicated from the development module 300).

The output module 210 can be configured to receive and process the driver signals to produce output signals. Particularly, the APU portion 418 and audio reproduction portion 422 can, in combination, be configured to receive and process the audio driver signals to produce audio output signals. The GPU portion 420 and the display portion 424 can, in combination, be configured to receive and process the graphics driver signals to produce graphics output signals.

Earlier mentioned, the output signals can be suitable for user perception. Particularly, the audio output signals can be audibly perceived. The graphics output signals can be visually perceived.

In this regard, the audio reproduction portion 422 can, for example, correspond to one or more speaker units. The display portion 424 can, for example, correspond to a display unit. In one example, the audio reproduction portion 422 can correspond to a left speaker unit and a right speaker unit. The left and right speaker units can be located at the left side of the display unit and at the right side of the display unit respectively. Additionally, the display unit can, for example, be a touch screen based display or a stereoscopic liquid crystal display (LCD).

The system 200 will be discussed in further detail hereinafter in the context of the applications module 202 being associated with, for example, a game based application.

In this regard, the source portion 402 can be configured to signal communicate game data to one or both of the engine portion 404 and the interceptor module 203. Game data can correspond to the aforementioned data signals. The engine portion 404 can, for example, be a game engine.

Usually, in a game, there will be one or more game characters and one or more game environments (i.e., scene setting) which can be visually perceived via the display portion 424. In the game, there can be a storyline or game rules and a gamer can play the game in accordance with the storyline or game rules. For example, there may be a need for the gamer to move one or more game characters in a game environment so as to achieve a certain objective. Appreciably, in a game, there can be one or more movable game characters and/or one or more stationary game characters. The movable game character(s) can be moved in accordance with gamer control to achieve a certain objective in the game. Furthermore, the game can include accompanying game audio such as background music, soundtracks and/or sound effects which can be audibly perceived via the audio reproduction portion 422.

For example, in a bowling game, the game characters can include a bowler, a bowling ball and a plurality of bowling pins. The game environment can be a bowling alley. In this regard, the movable game characters can be the bowler and the bowling ball. The stationary game characters can be the bowling pins. The game objective can be to knock down the bowling pins using the bowling ball and the game rules can correspond to real life bowling rules. In this regard, based on gamer control, the bowler and the bowling ball can be moved in a manner so as to knock down as many bowling pins as possible. The game audio can be the sound effect of a bowling ball knocking bowling pins down as the bowling ball contacts the bowling pins (i.e., collision).

Therefore, game data can, for example, be associated with one or more game characters and/or one or more game environments. The game data can, for example, be further associated with game audio.

With regard to game audio, game data can include/be associated with audio accompaniment data. Audio accompaniment data can be associated with the aforementioned audio based signals. Accompaniment data can be associated with sound effects data, background music data and/or soundtrack data in relation, respectively, to the aforementioned sound effects, background music and/or soundtracks. Audio accompaniment data can further be associated with timing data. The audio accompaniment data can, for example, be audio files such as mp3 based audio files or be in the form of one or more audio streams. In this regard, the aforementioned sound effects data, background music data and/or soundtrack data can correspond/relate to audio files such as mp3 based audio files and/or be in the form of one or more audio streams. Timing data can relate to a specific instance/specific instances in the game when a certain audio file/certain audio files/audio stream(s) is/are played/accessed.

Moreover, game data can include/be associated with one or both of object data corresponding to the aforementioned game character(s) and scene data corresponding to the aforementioned game environment(s). Object data and/or scene data can be associated with the aforementioned graphics based signals.

Each of the object data and scene data can be associated with vertex data, texture data and color data. Additionally, earlier mentioned, in a game, there may be more than one game character. In this regard, the object data can be associated with several objects. Of the several objects, there could be one or more objects of interest. The remaining objects (i.e., aside the one or more objects of interest) can be considered secondary objects. In this regard, object data can be associated with one or both of object(s) of interest and secondary object(s).

In one embodiment, the game data can be communicated from the source portion 402 to the engine portion 404. Game data can be further communicated from the source portion 402 to the interceptor module 203. The engine portion 404 can be configured to receive and process the game data in a manner so as to extract metadata. Metadata extracted can be indicative of movement data. Movement data can relate to movement of movable game characters in a game. Metadata can correspond to the aforementioned engine signals. Preferably, game data and engine signals can be communicated to the interceptor module 203 for processing to produce interceptor signals. Alternatively, engine signals can be communicated to the interceptor module 203 for processing to produce interceptor signals.

In another embodiment, the game data can be communicated from the source portion 402 to the interceptor module 203. The interceptor module 203 can be configured to receive and process the game data in a manner so as to produce interceptor signals.

In this regard, one or both of game data and engine signals can be received and processed by the audio interceptor portion 410 and/or the graphics interceptor portion 412 to produce, respectively, audio interceptor signals and/or graphics interceptor signals.

The audio interceptor portion 410 and processing of audio interceptor signals by the processor module 204 will be discussed later in further detail. An overview of the graphics interceptor portion 412 and processing of graphics interceptor signals by the processor module 204 will be given hereinafter and discussed later in further detail with reference to FIG. 5.

The graphics interceptor portion 412 can be configured to receive and process the game data to produce graphics interceptor signals which can be communicated to and processed by the processor module 204 in a manner so as to identify one or both of object(s) of interest and the secondary object(s).

In one example, the graphics interceptor portion 412 can be configured to receive and process the game data to produce object data. Object data can be communicated from the graphics interceptor portion 412 to the processor module 204 for further processing. The processor module 204 can be configured to process the object data in a manner so as to, for example, identify one or more objects of interest and secondary objects. In this regard, the object data can correspond to the graphics interceptor signals.

In a more specific example, the processor module 204 can be configured to process the object data so as to identify one object of interest. The remaining objects can be identified by the processor module 204 as secondary objects. In the game application, the object of interest could be in motion whereas the secondary objects are stationary. Therefore, the object(s) of interest can correspond to the aforementioned movable game character(s) and the secondary object(s) can correspond to the aforementioned stationary game character(s).

The processor module 204 can be further configured to process the vertex data of the object of interest in a manner so as to identify location of the object of interest as it moves. For example, the processor module 204 can be configured to process the vertex data of the object of interest so as to identify the location of the object of interest on the display unit (i.e., onscreen). Specifically, the processor module 204 can be configured to process the vertex data of the object of interest so as to identify the initial location of the object of interest, the location(s) of the object of interest as it moves and the end location of the object of interest after it stops moving (i.e., comes to rest).

Alternatively, location of the object of interest, as it moves, can be identified based on metadata (i.e., engine signals) communicated from the engine portion 404 to the graphics interceptor portion 412 since extracted metadata can be indicative of movement data and movement data can relate to movement of movable game characters (i.e., object of interest) in a game. Yet alternatively, location of the object of interest, as it moves, can be identified based on a combination of vertex data of the object of interest and metadata (i.e., engine signals).

The graphics interceptor portion 412 can yet be further configured to receive and process the game data to produce graphics interceptor signals which can be communicated to and processed by the processor module 204 in a manner so as to identify/derive scene characteristics associated with the scene data.

Scene characteristics can be associated with characteristics such as shape data, material data and/or size data of the game environment.

Shape data can be associated with, for example, shape of the game character(s) (e.g., geometric shape of the bowling ball, bowling pins) and/or shapes of other objects in the game environment. Material data can be associated with, for example, surface type of the game character(s) (e.g., the bowling ball) and/or other objects in the game environment (e.g., the bowling lane). For example, material data can be associated with whether the surface type of a game character(s) or an object in the game environment is reflective, shiny or non-reflective (e.g., the bowling ball has a glittering type surface/the bowling lane has a matt wood type surface). Size data of the game environment can be associated with, for example, room size/spaciousness of the game environment or simulated physical dimensions of the game environment (e.g., spaciousness/size of the bowling alley or width/length of the bowling lane).

For example, the graphics interceptor portion 412 can be configured to receive and process the game data to produce scene data. Scene data can be communicated from the graphics interceptor portion 412 to the processor module 204 for further processing. The processor module 204 can be configured to process the scene data in a manner so as to, for example, identify/derive scene characteristics associated with the scene data. In this regard, the scene data can correspond to the graphics interceptor signals.

Therefore the graphics interceptor portion 412 can, for example, be a buffer (e.g., First In First Out type buffer)/processor/module configurable to process the game data in a manner so that the graphical aspect/portion (e.g., object data and/or scene data) of the game data can be extracted and communicated to the processor module 204 for further processing.

As an option, one or both of the event processing module 206 and the development module 300 can be configured to communicate, respectively, event signals and additional input signals to the processor module 204. In this regard, the processor module 204 can be configured to process the graphics interceptor signals based on the event signals and/or additional input signals.

For example, the event processing module 206 can receive and process input signals from the input event module 205. The input event module 205 can correspond to a user input device such as a touch based screen display unit or a touchpad. As such, a user can touch the input event module 205 which will in turn generate input signals. The event processing module 206 can be configured to receive and process the input signals to produce the event signals which can be communicated to the processor module 204. For example, in the bowling game, a gamer can manipulate movement of the bowler and hence the movement of the bowling ball. Therefore, input signals can be based on the gamer's contact of the input event module 205 to move the bowler and the event signals can be associated with movement of the objects of interest (i.e., the bowler and the bowling ball). The event processing module 206 can process the input signals based on a state machine to produce the event signals. The state machine can, for example, be based on the game rules/objective of the game.

Therefore, based on the event signals communicated from the event processing module 206, the processor module 204 can be configured to process object data to, for example, identify location of the object of interest as it moves. Notably, since the event signals can, for example, be associated with movement of an object of interest, it may not be necessary to process the vertex data of the object of interest to identify location of the object of interest as it moves. Thus it is possible for the event processing module 206 to process the object data based on the event signals to, for example, identify location of the object of interest as it moves. In this manner, the processor module 204 can receive and process graphics interceptor signals and/or the event signals, so as to produce control signals.

Additionally, as mentioned earlier the foregoing gives a general overview of the graphics interceptor portion 412 and processing of graphics interceptor signals by the processor module 204. The graphics interceptor portion 412 and processing of graphics interceptor signals by the processor module 204 will be discussed later in further detail with reference to FIG. 5.

Further earlier mentioned, game data can include/be associated with audio accompaniment data. Audio accompaniment data can be communicated from the source portion 402 and received by the audio interceptor portion 410 for processing to produce audio interceptor signals. Audio accompaniment data can, for example, be associated with timing data, sound effects data, background music data and/or soundtrack data. Additionally, sound effects data, background music data and/or soundtrack data can be associated with one or more audio characteristics. The audio interceptor portion 410 will be discussed in further detail hereinafter.

The audio interceptor portion 410 can be configured to process game data so as to produce audio accompaniment data. In this regard, audio accompaniment data can correspond to the aforementioned audio interceptor signals.

The processor module 204 can, for example, be configured to receive and process the audio accompaniment data based on the graphics interceptor signals to produce control signals.

In one example, the processor module 204 can be configured to process audio accompaniment data based on identification of location of the object of interest as it moves. The processor module 204 can be configured to process timing data and sound effects data based on location of the object of interest as it moves. For example, in the bowling game, where the bowling ball has been identified as the object of interest and the bowling ball is moves from a start point to an end point (e.g., rolled from the bowler's position to the location of the bowling pins), timing data and sound effects data can be processed by the processor module 204 such that a "thud" sound effect can be audibly perceived as the bowling ball is dropped at the start point, a "rolling" sound effect can be audibly perceived as the bowling ball rolls towards the bowling pins and a "collision" sound effect can be audibly perceived as the bowling ball collides with the bowling pins. The "thud" sound effect, the "rolling" sound effect and the "collision" sound effect are examples of sound effect data. Earlier mentioned, the audio accompaniment data can, for example, be in the form of one or more audio streams. In this regard, the "thud" sound effect can be associated with/correspond to one audio stream, the "rolling" sound effect can be associated with/correspond to another audio stream and the "collision" sound effect can be associated with/correspond to yet another audio stream.

Additionally, the start point can be visually perceived to be near the left side of the display portion 424 and the end point can be visually perceived to be near the right side of the display portion 424. Therefore the timing data can be processed such that the "thud" sound effect, "rolling" sound effect and "collision" sound effect are timed such that the "thud" sound effect can be substantially audibly perceived only at the left side of the display portion 424 (i.e., via the left speaker unit) as the bowler is visually perceived to drop the bowling ball, the "rolling" sound effect can be substantially audibly perceived to vary in loudness as the bowling ball is visually perceived to roll from the left side to right side of the display portion 424 (i.e., initially loudest at the left side of the display portion 424 at the start point, gradually reducing loudness at the left side of the display portion 424 as the bowling ball rolls towards the right side of the display portion 424, gradually increasing loudness at the right side of the display portion 424 as the bowling ball approaches the right side of the display portion 424 and finally loudest at the right side of the display portion 424 at the end point) and the "collision" sound effect can be substantially audibly perceived only at the right side of the display portion 424 (i.e., via the right speaker unit) as the bowling pins are visually perceived (i.e., via the display portion 424) to be knocked down by the bowling ball.

In this regard, it is appreciable that the processor module 204 can, in one embodiment, be configured to process the audio accompaniment data (associable with timing data and sound effect(s) data) based on the graphics interceptor signals in a manner so as to time sound effect(s) in accordance with visual perception of the object(s) of interest. For example, the "thud" sound effect can be timed such that it is heard when it can be visually perceived that the bowler has dropped the bowling ball and the "collision" sound effect can be timed such that it is heard when it can be visually perceived that the bowling ball collides with the bowling pins. Since sound effect(s) can be timed in accordance with visual perception of the object(s) of interest, it is possible to deduce location of the object of interest based on the sound effect(s). Therefore, deduction of location of the object of interest can be based on timing data. In this regard, the processor module 204 can be configured to process the audio interceptor signals in a manner so as to identify location of the object of interest. Thus, aside identifying location of the object of interest based on the aforementioned vertex data, metadata, event signals and/or additional input signals, location of the object of interest can be based on audio interceptor signals communicated from the audio interceptor portion 410.

Further appreciably, the processor module 204 can, in another embodiment, be configured to process the audio accompaniment data based on the graphics interceptor signals in a manner so as to position the sound effect(s) in accordance with visual perception of the object(s) of interest. Specifically, the sound effect(s) can be associated with a location in the game environment (e.g., bowling alley). The "thud" sound effect can be associated with a location at the start point of the game environment (e.g., location of the bowler) and the "collision" sound effect can be associated with a location at the end point of the game environment (e.g., location of the bowling pins). Therefore, the "thud" sound effect can be audibly perceived by a gamer to be emitted from a location which is substantially at the left side of the display portion 424 and the "collision" sound effect can be audibly perceived by a gamer to be emitted from a location which is substantially at the right side of the display portion 424. In this manner, the processor module 204 can be configured to process the audio accompaniment data based on the graphics interceptor signals so as to allow audio positioning based on object(s) of interest.

Yet further appreciably, the processor module 204 can, in yet another embodiment, be configured to process the audio accompaniment data based on the graphics interceptor signals in a manner so as to vary audio characteristic(s) (e.g., loudness) of the sound effect(s) in accordance with visual perception of the object(s) of interest. For example, the audio characteristic of a sound effect can be loudness of the sound effect. In a more specific example, the loudness of the "rolling" sound effect at the right/left side of the display portion 424 can be varied in accordance with rolling movement of the bowling ball.

In yet a further embodiment, the processor module 204 can be configured to process the audio accompaniment data based on the graphics interceptor signals in a manner so as to time sound effect(s) in accordance with visual perception of the object(s) of interest, so as to position the sound effect(s) in accordance with visual perception of the object(s) of interest and/or so as to vary audio characteristic(s) of the sound effect(s) in accordance with visual perception of the object(s) of interest.

Therefore, the processor module 204 can be configured to process the audio accompaniment data based on the graphics interceptor signals in a manner so that sound effect(s) can be audibly perceived in accordance with visual perception of the object(s) of interest. As discussed in the above example, timing of sound effects (e.g., "thud," "rolling," and "collision"), audio characteristic(s) (e.g., loudness) and/or position of the sound effects can be based on visually perceived location/activities (e.g., drop at the start point, rolling from the start point to the end point and collision at the end point) of the object of interest (e.g., bowling ball).

Therefore the audio interceptor portion 410 can, for example, be a buffer (e.g., First In First Out type buffer)/processor/module configurable to process the game data in a manner so that the audio aspect/portion (e.g., audio accompaniment data) of the game data can be extracted and communicated to the processor module 204 for further processing.

Although the foregoing is described in the context of sound effect(s) data, it is understood that other examples (e.g., background music data, soundtrack data) of audio accompaniment data can equally apply.

Furthermore, although the foregoing is described in the context of object(s) of interest, it is understood that other types of data such as scene data and object data in association with secondary objects can equally apply.

In one example, in relation to the scene data, based on the material data where an object in the game environment can be visually perceived to be shiny, the processor module 204 can be configured to process the audio accompaniment data so that a "glittering"/reverb sound effect/background music/soundtrack can be produced corresponding to the material data which indicates that the object in the game environment is shiny.

In another example, in relation to the scene data, based on the size data of the game environment, the processor module 204 can be configured to process the audio accompaniment data so that an "echo" sound effect can be produced corresponding to room size/spaciousness of the game environment or simulated physical dimensions of the game environment (e.g., spaciousness/size of the bowling alley or width/length of the bowling lane).

Therefore the audio accompaniment data can be processed by the processor module 204 to produce control signals based on the graphics interceptor signals as discussed earlier.

Appreciably, with the audio accompaniment data being processed by the processor module 204 based on the graphics interceptor signals, automated attachment and tracking of audio accompaniment data to visually perceivable objects of interest can be made possible.

Although automated attachment and tracking of audio accompaniment data to visually perceivable objects of interest can be possible, it is possible for attachment and tracking to be accomplished manually/randomly by, for example, use of the event processor module 206 and/or development module 300.

Further appreciably, based on the foregoing discussion on how audio accompaniment data can be processed based on the graphics interceptor signals, (e.g., audio positioning based on object(s) of interest and reverb sound effect etc.) 3D based audio and/or audio modifications can be made possible.

Earlier mentioned, game based applications typically rely on game engines for processing tasks which are graphics and/or audio related. However, in doing so, there is a need to provide drivers which are specific to games. By providing an interceptor module 203, data signals can essentially be intercepted and processed (e.g., modified, customized) by the processor module 204 to provide control signals so that drivers specific to games need not be required.

Additionally, since the interceptor module 203 intercepts and facilitates the processing (by the processor module 204) of data signals (e.g., game data) communicated from the source portion 402, it is possible to make modifications and/or customizations without having to access the source-code and/or release packages of an application (e.g., a game). In this regard, processing of, for example, data signals communicated from the applications module 202 can be facilitated in an efficient manner and/or user friendly manner.

Earlier, a general overview of the graphics interceptor portion 412 and processing of graphics interceptor signals by the processor module 204 was given. The graphics interceptor portion 412 and processing of graphics interceptor signals by the processor module 204 will be discussed hereinafter in further detail with reference to FIG. 5.

Figure 5:
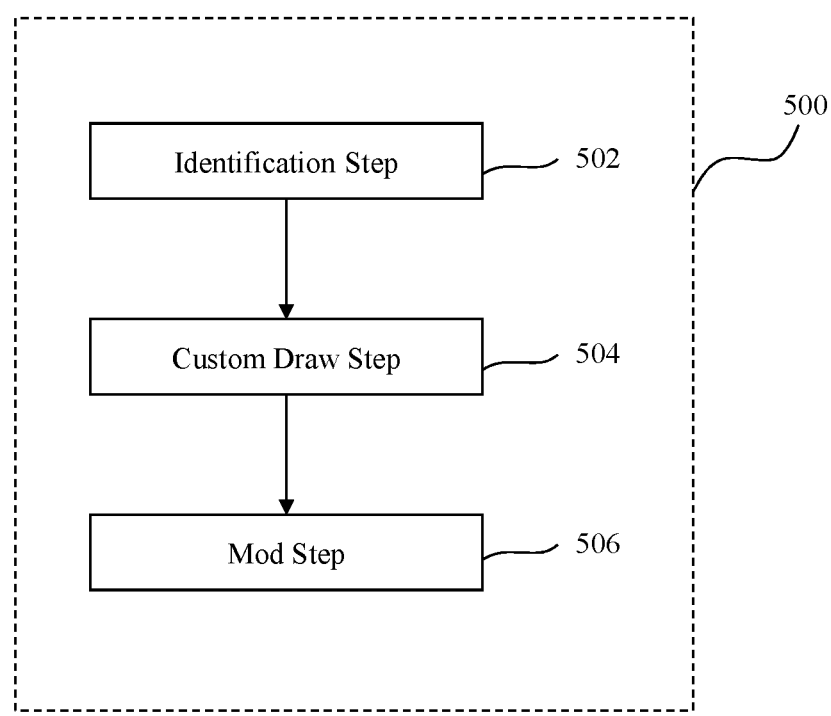
FIG. 5 shows a process flow diagram in relation to the work flow of the graphics interceptor portion of FIG. 4, in accordance with an embodiment of the disclosure.

FIG. 5 shows a process flow diagram 500 in relation to the work flow of the graphics interceptor portion 412 and processing of graphics interceptor signals by the processor module 204.

The process flow diagram 500 can begin by obtaining data signals from the source portion 402. Data signals can be associated with, for example, object data and/or scene data. Additionally, each of the object data and/or scene data can be associated with vertex data, texture data and color data.

As shown, the process flow diagram 500 can include an identification step 502, a custom draw step 504 and a mod step 506.

At the identification step 502, data signals can be processed to obtain digital signature(s) which can be used for identification. For example, in the case of object data, the object data can be processed to identify, for example, the object(s) of interest and/or secondary object(s). In this regard, an object of interest and/or a secondary object can be associated with at least one unique digital signature. A digital signature can, for example, be based on vertex data and texture data.

In one example, the interceptor module 203 and/or the processor module 204 can be coupled to a database (not shown) containing a collection of digital signatures associated with the object(s) of interest and/or secondary object(s). Based on the vertex data and texture data of, for example, an object of interest, a look up can be performed to match the vertex data and texture data of the object of interest with the collection of digital signatures in the database so as to identify the object of interest.

In a more specific example, in the bowling game, the bowling ball (i.e., the object of interest) can be associated with vertex data and texture data. Therefore, based on game data communicated from the source portion 402, vertex data and texture data of the visually perceived bowling ball in the game can be derived by the graphics interceptor portion 412 and/or the processor module 204. The collection of digital signatures in the database can include a digital signature which specifies what the vertex data and texture data of a bowling ball should be. The vertex data and texture data (based on game data) derived by the graphics interceptor portion 412 and/or the processor module 204 can be identified as a "bowling ball" if they match those (i.e., the digital signature in the collection of digital signatures which corresponds to "a bowling ball") specified in the database.

As an alternative, it is possible to identify an object of interest based on event signals communicated by the event processing module 206 and/or additional input signals communicated by the development module 300. For example, as mentioned earlier, the event processing module 206 can receive and process input signals from the input event module 205. The input event module 205 can, for example, be a touch based screen display unit. In the bowling game, a gamer can manipulate movement of the bowler and/or movement of the bowling ball by touching the input event module 205. Therefore, input signals can be based on the gamer's contact of the input event module 205 to move the bowler and the event signals can be associated with movement of the objects of interest (i.e., the bowler and the bowling ball). Therefore, an object visually perceived to be in the region coinciding with the gamer's contact of the input event module 205 can be identified as an object of interest (e.g., the bowler).

As another alternative, it is possible to identify an object of interest based on salient region. Saliency may be based on detection of high activity in the game environment during game play. For example, in the bowling game, the bowling ball may be rolling across the bowling lane. Such an activity (bowling ball rolling) can be considered as high activity. Therefore the bowling ball can be identified as an object of interest.

Additionally, identification can be aided by the development module 300. For example, identification associated with texture data may be a tedious process. The digital signature associated with texture data can be captured and extracted so as to aid in future identification of the texture data. The development module 300 can, for example, be a software development kit.

At the custom draw step 504, the data signals can be processed (i.e., by the processor module 204) for the purpose of changing/manipulating visual appearance. For example, in the case of object data/scene data, vertex data, texture data and/or color data associated with the object data/scene data can be manipulated in a manner so as to change the appearance of, for example, the object of interest/game environment.

In one example, depth information can be added and/or modified. This is particularly useful for two dimensional (2D) objects in the game. Specifically, if the bowling ball (i.e., object of interest) appears to be 2D in the bowling game, it can be useful to include depth information so that the bowling ball can be visually perceived as a 3D object (i.e., 3D bowling ball instead of the original 2D bowling ball in the game). In this regard, artificial 3D objects can be created and/or depth perception can be enhanced.

In another example, shadow information can be added and/or modified. Specifically, shadows can be added to, for example, the object(s) of interest or the original shadow information of the object(s) of interest can be modified. Shadows can, for example, be computed based on shape data (i.e., geometry of, for example, the object(s) of interest) and/or pre-defined light sources. Elaborating, the scene data could include lighting data to indicate one or more light sources in the game environment and shadow information can be computed based in lighting data and shape data of the object(s) of interest. Specifically, in the bowling game, shape data can indicate that the geometric shape of the bowling ball (i.e., object of interest) is spherical and lighting data can indicate that there are some light sources (e.g., ceiling lights, spotlights) in the bowling alley (i.e., game environment). Therefore, shadow information can be computed so that the angle/size etc. of the shadow of the bowling ball can change as it rolls along the bowling lane and based on whether it is rolling towards/away from a light source. In this regard, artificial shadows and/or original shadows of, for example, an object of interest can be created and/or modified to enhance visual perception and/or enhance depth perception.

In another example, customized visuals can be added. Examples of customized visuals are visual cues and/or maps. In this regard, scene data can be manipulated in a manner so as to include additional customized visuals. The customized visuals can, for example, be visually perceived to be superimposed to the game environment.

Visual cues can relate to visual aids to help a gamer (who may be a beginner) to play the game. For example, in the bowling game, visual cues can be in the form of arrows or projected rolling paths of the bowling ball. With the visual cues, a gamer may be able to train and learn how to play the game. A visual cue can be augmented on-screen (e.g., visually perceivable game environment) to show a gamer how to play the game more effectively.

Maps can relate to game maps showing an overview of the game environment. With a game map, a gamer may be able to better appreciate the game and navigate game characters in a more efficient manner while playing the game.

In yet another example, lighting effects can be added/modified/customized. Specifically, scene data can include lighting data to indicate one or more light sources in the game environment. The light sources generally are indicative of portions of the game environment that appear to be bright. In this regard, it is appreciable that the game environment can include portions that are dark (e.g., dark corners) where light sources are not available. Therefore, lighting effects can be customized or added so that dark corners in the game environment can become illuminated. Lighting effects can also be modified so as to increase or reduce brightness in bright portions of the game environment.

In yet a further example, special graphics effects can be added. Specifically, in the case of object data/scene data, the vertex data, texture data and/or color data of the object data/scene data can be manipulated so that special graphics effects can be added. As an example, an object of interest (i.e., bowling ball) may originally appear to have a shiny surface. Special graphics effects can be added such that the shiny surface is replaced with a "sandy" look or "charcoal" look.

At the mod step 506, the aforementioned changes/modifications/customizations to, for example, the vertex data, texture data and/or color data of the object data and/or scene data (e.g., as discussed in the custom draw step 504) are implemented. Specifically, changes/modifications/customizations to the data signals (i.e., game data) are implemented and prepared for communication to the driver module 208. In this regard, the control signals communicated from the processor module 204 can be considered to be mods of the original data signals.

For completeness, communication of control signals from the processor module 204 will now be described in relation to the driver module 208 and the output module 210.

The processor module 204 transmits the control signals and the driver module 208 receives the control signals. The control signals can be considered to be changes/modifications/customizations of the data signals. The driver module 208 processes the control signals so as to produce driver signals which can be communicated to the output module 210 to produce output signals (audio output signals and/or graphics output signal) which can be audibly perceived (in the case of audio output signals) and/or visually perceived (in the case of graphics output signals) by a user (e.g., a gamer).

Figure 6:
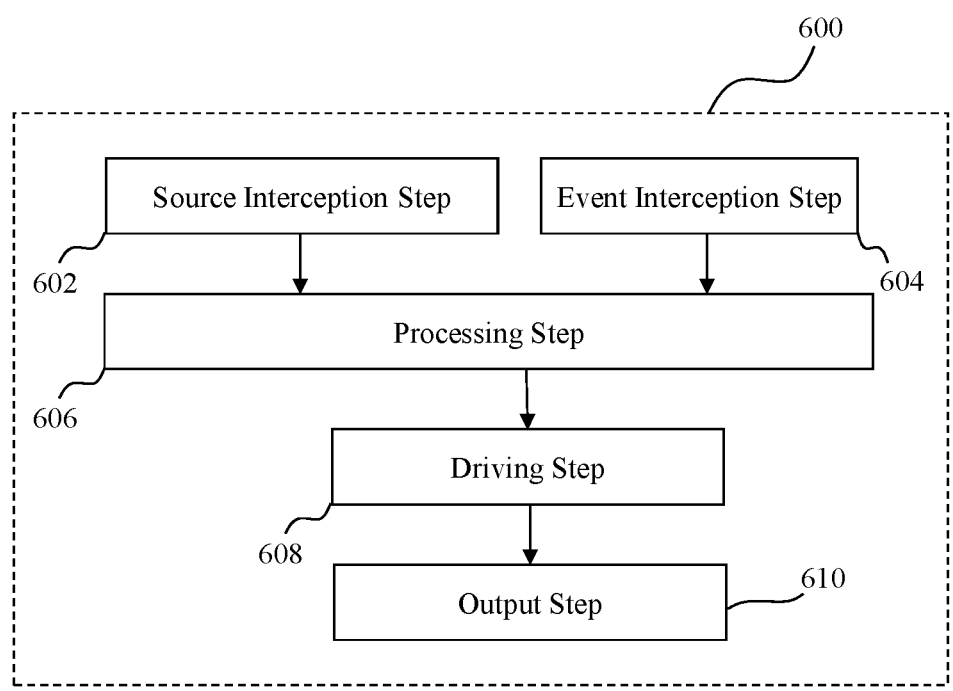
FIG. 6 shows a process flow diagram in relation to a method of processing in association with the system of FIG. 2, in accordance with an embodiment of the disclosure.
Figure 7:
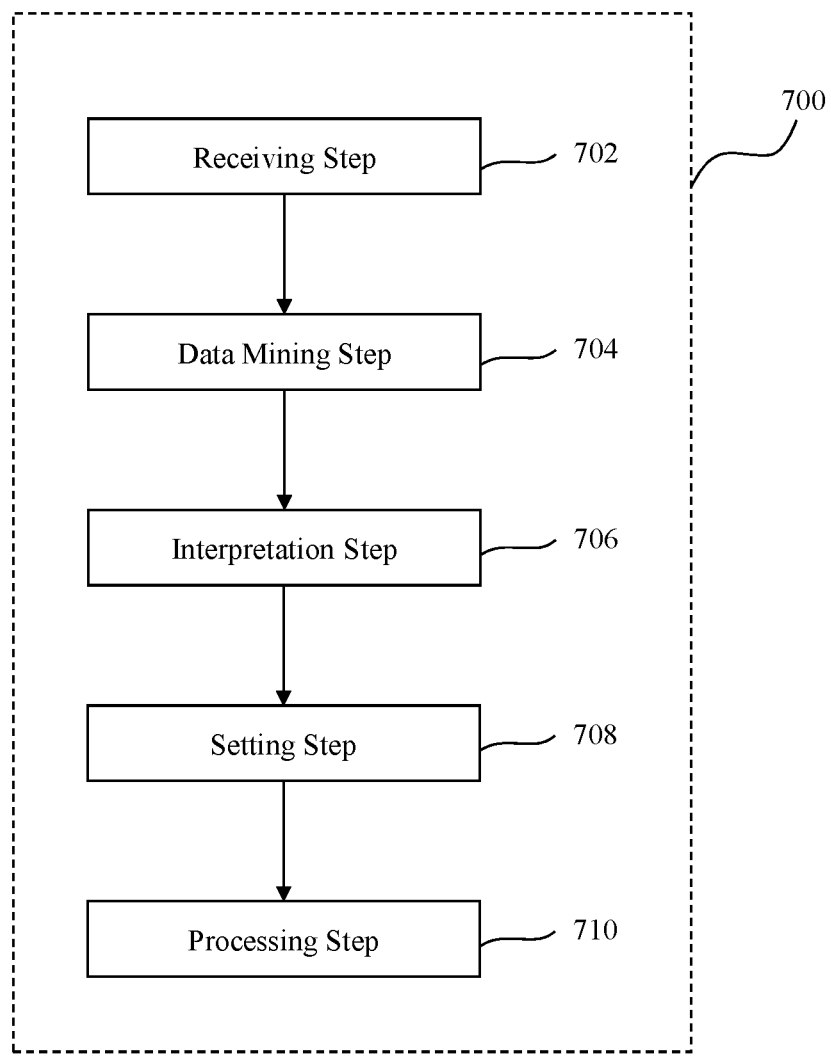
FIG. 7 shows a process flow diagram in relation to a method of processing in association with the system of FIG. 2, in accordance with an embodiment of the disclosure.

FIG. 6 and FIG. 7 each show a process flow diagram in relation to a method of processing in association with the system 200. FIG. 6 shows a process flow diagram in relation to a method of processing (labeled as 600 in FIG. 6) in accordance with one embodiment of the disclosure. FIG. 7 shows a process flow diagram in relation to a method of processing (labeled as 700 in FIG. 7) in accordance with another embodiment of the disclosure.

Referring to FIG. 6, a method of processing 600 in association with the system 200, in accordance with one embodiment of the disclosure, is shown.

The method of processing 600 can include one or both of a source interception step 602 and an event interception step 604. The method of processing 600 can also include a processing step 606. The method 600 can, as an option, further include one or both of a driving step 608 and an output step 610.

At the source interception step 602, application signals can be intercepted and the intercepted application signals can be processed to produce interceptor signals. Specifically, application signals communicated from the applications module 202 can be intercepted by the interceptor module 203. The interceptor module 203 can be configured to intercept the application signals and process the intercepted application signals to produce interceptor signals. This has been discussed in detail earlier in, for example, FIG. 2 to FIG. 4. Therefore, relevant portions of the earlier discussion analogously apply.

At the event interception step 604, input signals can be intercepted and the intercepted input signals can be processed to produce event signals. Specifically, input signals communicated from the input event module 205 can be intercepted by the event processing module 206. The event processing module 206 can be configured to process the intercepted input signals to produce event signals. This has been discussed in detail earlier in, for example, FIG. 2 to FIG. 4. Therefore, relevant portions of the earlier discussion analogously apply.

At the processing step 606, one or both of the interceptor signals and the event signals can be processed to produce control signals. Specifically, interceptor signals and/or event signals communicated, respectively, from the interceptor module 203 and/or the event processing module 206 can be received by the processor module 204. The processor module 204 can be configured to process one or both of the interceptor signals and the event signals to produce control signals. This has been discussed in detail earlier in, for example, FIG. 2 to FIG. 4. Therefore, relevant portions of the earlier discussion analogously apply.

At the driving step 608, control signals can be processed to produce driver signals. Specifically, control signals can be communicated from the processor module 204 and received by the driver module 208 for processing. The driver module 208 can be configured to process the control signals to produce driver signals. The driver signals can be communicated from the driver module 208 to one or both of the applications module 202 and output module 210. This has been discussed in detail earlier in, for example, FIG. 2 to FIG. 4. Therefore, relevant portions of the earlier discussion analogously apply.

At the output step 610, the driver signals can be processed to produce output signals. Specifically, driver signals can be communicated from the driver module 208 and received by the output module 210 for processing. The output module 210 can be configured to process the driver signals to produce output signals. The output signals can be one or both of audibly perceived and visually perceived. This has been discussed in detail earlier in, for example, FIG. 2 to FIG. 4. Therefore, relevant portions of the earlier discussion analogously apply.

Referring to FIG. 7, a method of processing 700 in association with the system 200, in accordance with another embodiment of the disclosure, is shown.

The method of processing 700 can include a receiving step 702, a data mining step 704 and an interpretation step 706. The method of processing 700 can further include a setting step 708 which can be optional. The method of processing 700 can yet further include a processing step 710.

At the receiving step 702, input signals can be received from the input event module 205. Earlier mentioned, the input event module 205 can correspond to a user input device such as a touch based screen display unit or a touchpad. Further examples of the user input device include a button (e.g., mechanical buttons such as tactile based button or electronic buttons such as touch screen based buttons). The input module 205 can further correspond to a sensor and/or an image capturing module. Examples of a sensor include a video type sensor, a depth sensor, a proximity sensor, an audio sensor, a 6-axis sensor, an environment sensor (e.g., barometer sensor/temperature sensor). An example of an image capturing module is a camera. The input module 205 can correspond to a user input device which is configurable to provide an audio track and/or interpret application signals communicated from the applications module 202 in a manner so as to provide a scene description (e.g., 2d/3d description of the scene data). It is appreciable that the input event module 205 can correspond to one or more user input devices and/or sensors. In this regard, the input event module 205 can correspond to one or more sources capable of communicating input signals. Therefore, the receiving step 702 can relate to receiving input signals from a plurality of sources.

At the data mining step 704, the input signals can be processed in a manner so as to identify one or both of unique characteristics and attributes which can be associated with the input signals. Specifically, the event processing module 206 can be configured to receive and process the input signals in a manner so as to identify one or both of unique characteristics and attributes which can be associated with the input signals.

Unique characteristics can relate to facial features and/or body pose of a user (e.g., the aforementioned gamer). For example, the input event module 205 can be configured to capture an image of a gamer so as to detect the facial features of the gamer which can, for example, relate to eye contact (as will be discussed later in further detail).

Attributes can, for example, relate to the aforementioned shape data, material data and/or size data. Earlier mentioned, shape data can be associated with, for example, shape of the game character(s) (e.g., geometric shape of the bowling ball, bowling pins) and/or shapes of other objects in the game environment. Material data can be associated with, for example, surface type of the game character(s) (e.g., the bowling ball) and/or other objects in the game environment (e.g., the bowling lane). For example, material data can be associated with whether the surface type of a game character(s) or an object in the game environment is reflective, shiny or non-reflective (e.g., the bowling ball has a glittering type surface/the bowling lane has a matt wood type surface). Size data of the game environment can be associated with, for example, room size/spaciousness of the game environment or simulated physical dimensions of the game environment (e.g., spaciousness/size of the bowling alley or width/length of the bowling lane).

As a further example, unique characteristics and/or attributes which can be associated with the input signals can relate to the aforementioned salient region.

In this regard, the data mining step 704 can relate to data mining the input signals to identify at least one of unique characteristics and attributes associable with the input signals.

At the interpretation step 706, the mined data can be processed (i.e., interpreted) in a manner so as to form association based on one or both of the unique characteristics and attributes. Specifically, the event processing module 206 can be configured to process the mined data by interpreting the mined data in a manner so as to form association based on one or both of the unique characteristics and attributes.

In one example, forming of association can relate to the aforementioned identify an object of interest and/or secondary objects, identification of the location of the object of interest as it moves. Identification of location can, in one example, be based on real-time movement of the object of interest and/or secondary object. Identification of location can, in another example, be based on predicted location of the object of interest and/or secondary object. Prediction can be based on predicted movement of the object of interest and/or secondary object.

In another example, forming of association can relate to the aforementioned processing of audio accompaniment data. Earlier mentioned, processing of audio accompaniment data can be in relation to, for example, timing data, sound effect(s) data, background music data and/or soundtrack data.

In yet another example, forming of association can relate to the aforementioned examples such as processing audio accompaniment data based on material data and/or size data. Thus it is appreciable that other examples and/or discussion in the foregoing can analogously apply as appropriate.

In this regard, the interpretation step 706 can relate to interpreting the mined data in a manner so as to form association based on the at least one of unique characteristics and attributes.

At the optional setting step 708, a set of settings can be provided to determine extent of modification/alteration. Specifically, extent of modification/alteration to the input signals can be based on the provided set of settings. More specifically, the event processing module 206 can be associated with a set of settings which can be based upon to determine extent of modification/alteration to the input signals. The event processing module 206 can, for example, be preset with the set of settings by a user (e.g., the aforementioned gamer) or during factory configuration. The set of settings can be used to determine extent of modification/alteration in one or both of visual perception and audio perception in association with the input signals.

In one example, based on the settings, depth information (e.g., how deep or shallow), shadow information (e.g., length of shadow, direction of shadow, brightness or darkness of shadow) and/or lighting data (e.g., brightness or darkness) can be adjusted. In this manner, visual perception associated with the input signals can be modified/altered.

In another example, based on the settings, the aforementioned audio characteristic(s) can be varied/adjusted. In this manner, audio perception associated with the input signals can be modified/altered.

In this regard, the setting step 708 can relate to providing a set of settings. The set of settings can be used to determine extent of modification/alteration in one or both of visual perception and audio perception in association with the input signals.

At the processing step 710, the input signals can be processed based on the interpretation of the mined data and the set of settings to produce output signals. Specifically, the event processing module 206 can be configured to process the input signals based on the interpretation of the mined data and the set of settings to produce output signals. The output signals can correspond to alteration/modification of one or both of visual perception and audio perception of the input signals. By altering/modifying (based on/according to the set of settings) visual and/or audio perception of the input signals based on formed association (i.e., interpretation of mined data), the input signals can be considered to be adaptably altered. Adaptably altered input signals can correspond to adaptable alteration of one or both of visual perception and audio perception of the input signals.

In one example, after the input signals have been data mined to identify an object of interest, the object of interest can be processed (by the event processing module 206) based on the set of settings in a manner such that visual perception of the object of interest can be altered/modified. For example, the object of interest can be processed based on the set of settings so that it can be visually perceived (as output signals) to be brighter (i.e., modification/alteration of lighting data).

In another example, after the input signals have been data mined to form an association between an object of interest with a sound effect, audio characteristic(s) (e.g., loudness) of the sound effect can be varied in accordance with visual perception of the object of interest.

In yet another example, based on eye contact of a user (i.e., location of the user's head), the object data can be adjusted/altered/modified so that the object(s) of interest and/or secondary object(s) can be visually perceived to tilt or rotate in accordance with eye contact of the user. Appreciably, aside eye contact of the user, adjustment/alteration/modification can be based on other facial features which may be indicative of the user's mood. Such facial features may be analyzed by the event processing module 206 to derive the user's mood. For example, lighting data (brightness/darkness) can be adjusted/altered/modified in accordance with user's mood.

In this regard, the processing step 710 can relate to processing the input signals based on the interpretation of the mined data and the set of settings to produce output signals. Furthermore, the output signals can correspond to adaptably altered input signals which can be associated with adaptable alteration of at least one of visual perception and audio perception of the input signals.

Appreciably, by receiving input signals from a plurality of sources, associations formed may be more accurate (as opposed to associations formed based on input signals from a single source). In this regard, it may be possible to form associations with improved accuracy or enhanced audio perception (e.g., audio positioning based on object(s) of interest and reverb sound effect, 3D based audio and/or audio modifications etc.) and/or visual perception (e.g., depth information, shadow information and/or lighting data etc.).

For example, based on formed association in relation to identification of object of interest and eye contact of the user, it may be possible to produce output signals corresponding to adaptably altered input signals where the object of interest can be visually perceived to be brighter and rotated/tilted in accordance with eye contact of the user.

The method of processing 700 can be useful for application enhancements on new processor or operating system platform. Preferably the application enhancements can be automatic (without user intervention). Alternatively, the application enhancements can be semi-automatic (with some user intervention). Appreciably, a software application is usually developed based on a specific operating system platform and/or a target user group. However, by the time the software application is ready for release, the current (i.e., at the time of software application release) operating system may have far advanced (faster processor, more memory, additional features etc) and/or unique hardware features beyond the software application, thus resulting in possible incompatibility. With the method of processing 700 (or a processor configured based on the method of processing 700), an automatic way/semi-automatic way is provided for utilizing the aforementioned advancement and, at the same time, overcoming the possible incompatibility issue. Additionally, it is possible for a third party (e.g., a developer) can make changes to, for example, improve an application (e.g., the aforementioned game based application) by taking advantage of new or unique hardware features. Furthermore, an application (e.g., game based application) which has been released quite long ago can have updated visuals without having to update the application itself.

Additionally, the method of processing 700 (or a processor configured based on the method of processing 700) can be useful for providing an avenue (e.g., development kit/tool) to aid in audio and/or video enhancements for an application developer. Currently, additional resources may be required to add audio effects (e.g., 3D positional audio, reverb) and video effects (e.g., shadow, lighting) to an application. Appreciably, the method of processing 700 enables audio effects and/or video effects to be added in a more efficient manner (i.e., automatic/semi-automatic) so that human resource can be reduced. For example, 3D audio which may not exist at the time an application (e.g., a game based application) was created can be added by a third party (e.g., a game developer) without changing the application (e.g., the game).

Therefore it is appreciable that even if modifications (e.g., updating visuals, add 3D audio) are desired, the method of processing 700 (or a processor configured based on the method of processing 700) can facilitate the possibility of making such modifications without having to modify, for example, the game sourcecode and/or release packages. Thus the method of processing 700 is capable of facilitating processing in an efficient and/or user friendly manner.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, within the system 200 (e.g., the interceptor module 203/the processor module 204), at least one virtual camera model (not shown) can be defined. The virtual camera model can be configured to view a primary scene (i.e., scene data). The primary scene can be a game scene showing movement of the object of interest. In this regard, the virtual camera model can be initially positioned to view the primary scene. For example, the virtual camera model can be positioned to view a primary scene where the bowling ball (i.e., object of interest) is rolled across the bowling lane. It is appreciable that the virtual camera model can be further configured to view a secondary scene instead of the primary scene. In this regard, position of the virtual camera model can be changed from the initial position so as to view the secondary scene. The secondary scene can, for example, be associated with a secondary object. For example, the virtual camera model can be positioned to view a secondary scene where the bowling pins (i.e., secondary object(s)) are located. This is useful where a gamer desires a view from a different perspective. Specifically, the gamer may wish to only observe how the bowling ball collides with the bowling pins as opposed to observing the entire process of the bowling ball rolling across the bowling lane.

In this regard, the graphics interceptor portion 412 and/or the processor module 204 can be configured to receive and process, respectively, the data signals and/or the graphics interceptor signals in a manner so as to change position of the virtual camera model.

In another example, the graphics interceptor portion 412 and/or the processor module 204 can be configured to communicate scene capture signals to one or more remote devices/systems (not shown). The scene capture signals can correspond to the aforementioned primary scene and/or secondary scene.

This is useful for facilitating viewing of an ongoing game by one or more external parties (aside the gamer playing the game) from the perspective of the gamer (e.g., the primary scene) as the gamer plays the game or another perspective different from the gamer (e.g., the secondary scene). As mentioned, position of the virtual camera model can be changed. Hence one or more external parties may be allowed to view the ongoing game from the view a "freely movable camera" which is hosted by the gamer.

The one or more external parties can be viewing using remote devices or cloud based devices. As such, the devices used by the external parties can be identified by the system 200 as virtual GPU devices. Therefore, many virtual GPU devices can be associated with the system 200 and the scenes (primary and/or secondary) can be rendered by each virtual GPU locally (e.g., an external party's device) or over a network (e.g., cloud network).

In yet another example, the graphics interceptor portion 412 and/or the processor module 204 can be configured to receive and process, respectively, the data signals and/or graphics interceptor signals in a manner so as to capture scene data and export scene data to another system (not shown) for further processing. The exported scene data can optionally be stored in a database (not shown) which can be remote from the system 200. The scene data can include 3D scene vertices data.

This is useful where it is desired to edit the exported scene data. The edited scene data can then be further communicated other devices (not shown) for output/other uses (3D printing, rendering offline to generate an image). The edited scene data can be re-imported to the system 200 (e.g., at the graphics interceptor potion 412 and/or the processor module 204) to replace the original scene data.

In yet a further example, the event processing module 206 can be coupled to one or more input devices (not shown) and/or include one or more input devices. An input device can, for example, be a thermometer, a barometer, an image capturing device, an accelerometer, a microphone, a touch screen, a gyroscope, digital compass and/or a proximity sensor (e.g., IR based sensor, Bluetooth based sensor, motion sensor). In one example, the event processing module 206 can be coupled to an image capturing device. In another example, the event processing module 206 can include an accelerometer, a microphone, a gyroscope, digital compass and/or a proximity sensor (e.g., IR based sensor, Bluetooth based sensor, motion sensor). Based on input signals/processed input signals communicated from the input device(s), the event processing module 206 can be configured to produce event signals which can be communicated to the processor module 204.

This is useful where input signals from the input device(s) can be used to determine how the interceptor signals are processed by the processor module 204.

In one example, in a racing game, a steering wheel may be graphically presented. Hence the gyroscope (which may be an input device or a part of the event processing module

206) may sense rotation/turns (e.g., physical rotation of the input event module 205/the event processing module 206) made by the gamer based on the gamer's visual perception of the steering wheel. Event signals communicated from the event processing module 206 can be based on input signals corresponding to the rotation/turns made. Event signals can be communicated to the processor module 204 to process the graphics interceptor signals (e.g., modify scene data) and/or to process the audio interceptor signals (e.g., change sound effects).

In another example, the image capturing module can be configured to capture image of the gamer and/or detect surrounding conditions of the gamer. If the gamer looks away (i.e., eye contact not made), event signals can be communicated from the event processing module 206 based on input signals indicating that the gamer has looked away. The processor module 204 can, for example, process the audio interceptor signals based on the event signals so that a "warning" sound effect can be audibly perceived so as to alert the gamer. Alternatively, control signals can be communicated to the input driver part 302 which can produce input driver signals to the applications module 202.

Earlier mentioned, based on the input driver signals, communication of application signals from the applications module 202 can be affected. The input driver signals communicated from the input driver part 302 to the applications module 202 can correspond to feedback signals causing the applications module 202 to, for example, pause the game.

Furthermore, based on the input signals, haptic feedback (e.g., from the processor module 204, the input event module 205 and/or event processing module 206) and/or adaptive stereoscopy barrier control can be possible.

In yet a further additional example, the interceptor module 203 can be disposed between the source portion 402 and the engine portion 404. The source portion 402 can be coupled to the interceptor module 203 and the interceptor module 203 can be coupled to the engine portion 404.

Alternatively, it may be possible to include more than one interceptor module 203. For example, one interceptor module 203 can be disposed between the applications module 202 and the processor module 204 as shown in FIG. 3 and coupled as described earlier. Another interceptor module 203 can be disposed between the source portion 402 and the engine portion 404. The source portion 402 can be coupled to the interceptor module 203 and the interceptor module 203 can be coupled to the engine portion 404.

Moreover, it is appreciable that the processor module 204, when configured as described earlier (i.e., in FIG. 2 to FIG. 6), can be further configured to receive application signals directly from the applications module 202 of the system 200 and/or an analogous applications module (not shown) from another system (not shown) for processing in a manner so as to produce the aforementioned control signals. For example, the processor module 204 can be configured to receive the application signals and process the application signals based on the method of processing 600 of FIG. 6.

Additionally, although it is mentioned that the interceptor module 203 can, for example, include one or both of an audio interceptor portion 410 and a graphics interceptor portion 412, the interceptor module 203 can, as a further option, include a physics engine portion (not shown). The physics engine portion can, for example, be configured to receive and process the application signals in a manner so as to provide simulation data. The simulation data can be communicated to the processor module 204 for processing and control signals communicated from the processor module 204 can be based on the simulation data. Simulation data can, in one example, relate to identification of location of the object of interest as it moves/sometime in future (e.g., 2 seconds later). Simulation data can, in another example, relate to physical phenomena (e.g., the aforementioned collision of the object of interest) in which case control signals (i.e., from the processor module 204) can be communicated to the driver module 208 so that the driver signals produced by the driver module 208 can drive, for example, the output module 210 in a manner so as to, for example, produce touch based feedback such as haptic feedback. Therefore, output signals can correspond to, for example, haptic feedback. Of course, as earlier mentioned, haptic feedback can be from, for example, the processor module 204, the input event module 205 and/or event processing module 206. Therefore, driver signals can, accordingly, be communicated to (not shown) the processor module 204, the input event module 205 and/or event processing module 206.

Furthermore, it is appreciable that the interceptor module 203 can, as yet a further option, include an audio interceptor portion 410, a graphics interceptor portion 412 and/or a physics engine portion (not shown).

What is claimed is:

1. A method of processing in relation to an application based environment, comprising:
    intercepting data signals associated with an object data in relation to the application based environment;
    manipulating visual appearance of the object data by adding at least one customized visual so that the customized visual is visually perceived to be superimposed to the application based environment, wherein at least one of an object of interest and a secondary object is identifiable based on the object data corresponding to vertex data and texture data, associated with the at least one of the object of interest and the secondary object; and
    matching the vertex data and texture data with a collection of digital signatures in a database so as to identify the at least one of the object of interest and the secondary object,
    wherein manipulating visual appearance comprises replacing only original surface appearance of the at least one of the object of interest and the secondary object with another surface appearance.

2. The method of processing of claim 1 further comprising processing the data signals to obtain digital signatures usable for identification of the at least one of the object of interest and the secondary object.

3. The method of claim 1, wherein the application based environment relates to a game based environment.

4. The method of claim 1, wherein the at least one of the object of interest and the secondary object is identifiable based on the object data corresponding to event signals associated with the at least one of the object of interest and the secondary object, the method further comprising:
    matching the event signals that coincide with an object visually perceived to be in the event signals corresponding region so as to identify the at least one of the object of interest and the secondary object.

5. The method of claim 1, wherein the at least one of the object of interest and the secondary object is identifiable based on the object data corresponding to salient region associated with the at least one of the object of interest and the secondary object, the method further comprising:
    matching the salient region that coincides with an object with detected high activity so as to identify the at least one of the object of interest and the secondary object.

6. The method of claim 1, wherein the at least one of the object of interest and the secondary object is identifiable based on the object data corresponding to event signals associated with the at least one of the object of interest and the secondary object, the method further comprising:

matching the event signals that coincide with an object visually perceived to be in the event signals corresponding region so as to identify the at least one of the object of interest and the secondary object.

7. The method of claim 1, wherein the at least one of the object of interest and the secondary object is identifiable based on the object data corresponding to salient region associated with the at least one of the object of interest and the secondary object, the method further comprising:

matching the salient region that coincides with an object with detected high activity so as to identify the at least one of the object of interest and the secondary object.

8. A method of processing in relation to an application based environment, comprising:

intercepting graphic based data signals associated with object data in relation to the application based environment; and manipulating visual perception of the object data by processing the intercepted graphic based data signals with at least one visual manipulation so that the at least one visual manipulation is visually perceivable in the application based environment, wherein at least one of an object of interest and a secondary object is identifiable based on the object data corresponding to vertex data and texture data associated with the at least one of the object of interest and the secondary object; and matching the vertex data and texture data with a collection of digital signatures in a database so as to identify the at least one of the object of interest and the secondary object, wherein manipulating visual perception comprises changing an original visual perception associated with the at least one of the object of interest and the secondary object with a modified visual perception.

9. The method of claim 8, wherein the at least one visual manipulation is selected from the group consisting of vertex data, texture data, color data, depth information, shadow information, and customized visuals.

10. The method of claim 8, further comprising:

intercepting audio based data signals associated with the object data in relation to the application based environment; and manipulating audio perception of the object data by processing the intercepted audio based data signals with at least one audio accompaniment data so that the at least one audio accompaniment data is audibly perceivable in the application based environment, wherein manipulating audio perception comprises changing an original audio perception associated with the at least one of the object of interest and the secondary object with a modified audio perception.

11. The method of claim 10, wherein the at least one audio accompaniment data is selected from the group consisting of sound effects data, background music data, soundtrack data, and timing data.

12. The method of claim 10, wherein the at least one audio accompaniment data is based on the object data corresponding to at least one of identification of location of the object of interest, one or more audio streams, and the intercepted graphics based data signals.

* * * * *